Figure 1:
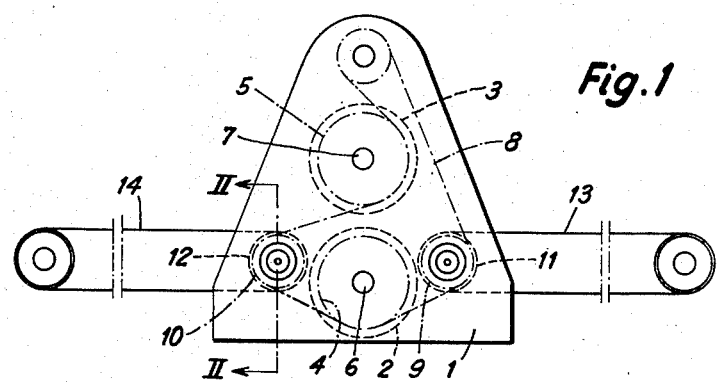

May 21, 1957 G. A. SEEWER 2,792,792
DOUGH SHEETER
Filed July 6, 1954

GUSTAVE A. SEEWER
INVENTOR

By

ATTYS.

United States Patent Office 2,792,792
Patented May 21, 1957

2,792,792

DOUGH SHEETER

Gustave August Seewer, Burgdorf, Switzerland

Application July 6, 1954, Serial No. 441,509

Claims priority, application Switzerland July 10, 1953

6 Claims. (Cl. 107—12)

The present invention relates to dough sheeters and more particularly to a dough sheeter of the class comprising a pair of superposed sheeting rolls adapted to be rotated in opposite directions, provision being, however, made for simultaneously reversing the direction of rotation of both rolls. In dough sheeters of this class, the dough is worked upon by the sheeting rolls in a number of consecutive alternating passages until its thickness is reduced to the desired value.

Still more particularly, the invention relates to a dough sheeter of this class comprising a first and a second dough conveyor device located on the ingress side and the egress side, respectively, or on the egress side and the ingress side, respectively, of said pair of sheeting rolls, depending on the directions of rotation of these rolls, and means for transmitting drive from at least one of said sheeting rolls to each of said conveyor devices.

In known dough sheeters of this class the conveyor devices located on both sides of the pan of sheeting rolls are made to be substantially equal to the peripheral speed of the sheeting rolls, in order to avoid tensile stresses in the dough on the egress side of the sheeting rolls. Although the ingress side and egress side are reversed several times during the operation, no difference was hitherto made between the conveying rates at the ingress side and egress side respectively. However, since the thickness of the dough is always much greater on the ingress side than on the egress side, and since the rates at which the dough travels on both sides adjacent the sheeting rolls are inversely proportional to the thickness of the dough, the dough is too strongly advanced by the conveyor on the ingress side and frequently is wrinkled, especially if it has already undergone one or several sheeting operations.

The present invention has for its main object to avoid this drawback of the known dough sheeters. This is attained by incorporating a clutch mechanism in the driving connection for each conveyor device, each of these clutch mechanisms being adapted to work either with slip or without slip depending on the direction of rotation of the sheeting rollers, the arrangement being such that always that conveyor device which is located on the egress side is moved without slip to convey dough away from the sheeting rolls at a conveying rate substantially equal to the peripheral speed of the sheeting rolls whilst at the same time the other conveyor device, located on the ingress side, is moved with slip to convey dough to the sheeting rolls at a conveying rate less than the peripheral speed of the sheeting rolls.

Preferably the slip of the clutch mechanisms is adjustable.

Figure 2:
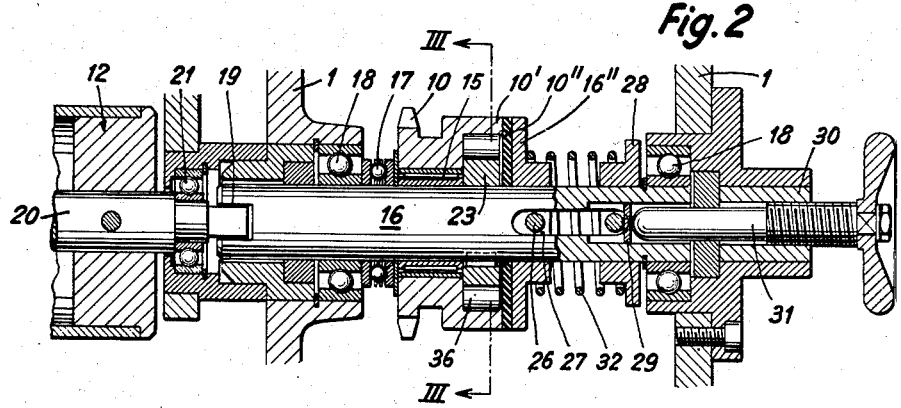
Figure 3:
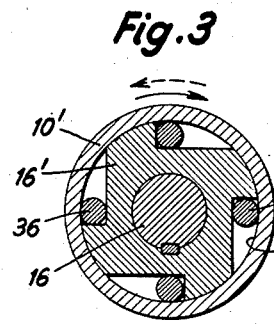
Figure 4:
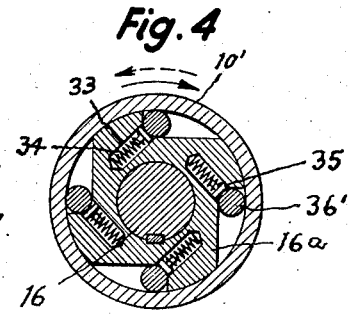

The invention will now be described by way of example with reference to the accompanying drawings, in which:

Fig. 1 is a diagrammatic elevational view of the dough sheeter,

Fig. 2 is a section view taken along the line II—II of Fig. 1 and shows the details of a clutch mechanism of one conveyor device, such mechanism including an overrunning clutch and a friction clutch, Fig. 3 is a cross-sectional view taken on line III—III of Fig. 2 and showing a form of the overrunning clutch mechanism, and, Fig. 4 is a cross-sectional view, similar to Fig. 3, and showing a modified slip clutch mechanism.

The dough sheeter diagrammatically represented in Fig. 1 is of the type well known in the art, comprising two conveyor devices positioned on either side of a pair of superposed sheeting rolls 2 and 3 which are mounted for rotation in opposite directions between a pair of bearing brackets 1 formed as hollow casings with two parallel lateral walls between which are arranged gear means for driving the sheeting rolls. Provision is made of means for reversing simultaneously the directions of rotation of both sheeting rolls which may be driven either by means of a crank handle or by means of a motor, e. g. an electric motor. The sheeting rolls 2 and 3 are rigidly connected with shafts or trunnions 6 and 7, respectively, to which are fixed sprocket wheels 4 and 5, respectively. An endless chain 8 runs in a well known manner over these sprocket wheels 4 and 5 and over sprocket wheels 9 and 10 mounted on shafts 16 which are in constant driving connection with driving drums 11 and 12, respectively, of the two conveyor devices having each an endless band indicated at 13 and 14, respectively.

The driving connection of each of the sprocket wheels 9 and 10 with the driving drum is similar for both conveyor devices. For this reason only the connection of the sprocket wheel 10 with the driving drum 12 of the corresponding left hand conveyor device has been represented in full details in Fig. 2.

The sprocket wheel 10 is mounted for free rotation on shaft 16 by means of antifriction roller bearings 15. The shaft 16 is mounted for rotation in the bracket walls 1 by means of a pair of ball bearings 18. The sprocket wheel 10 is formed in one piece with an annular flange 10' having a smooth cylindrical internal surface 37 coaxial to the shaft 16. This flange 10' constitutes a driving part of a clutch and surrounds a first driven part 16' of this clutch; this first driven part, which is fixed on shaft 16, has wedge-shaped recesses facing the surface 37 of flange 10'. These recesses have a radial abutment surface and a bottom surface perpendicular to the latter. All recesses of part 16' taper in the same peripheral direction and are fitted each with a friction roller 36 the diameter of which is slightly smaller than the greatest depth of the recess. If the driving part 10' of the so formed overrunning clutch rotates in the direction of the arrow drawn in full lines in Fig. 3, its surface 37 acts by friction on the rollers 36 and presses them against the bottom surfaces of the corresponding recesses. The clutch then acts as slipless overrunning clutch, i. e. rotary motion is transmitted without slip from the flange 10' of the sprocket wheel 10 to the part 16' and to shaft 16 which is held in constant driving connection with the driving drum 20 by means of a known kind of claw coupling 19. The driving drum 20 is rotatably mounted on the inward walls of the brackets 1 by means of ball bearings 21.

The overrunning clutch hereabove described is well known per se in the art and remains inactive when the direction of rotation of the sprocket wheel 10 has changed, such change taking place when the direction of rotation of the sheeting rolls is reversed so that the latter perform a further sheeting operation, the dough now traveling from left to right in Fig. 1 wherefore the conveyor device with the band 14 is now on the ingress side. The overrunning clutch comprising the flange 10' remains inactive because this flange now rotates in the direction indicated by the arrow drawn in dotted lines in Fig. 3 and does not exert any clamping action on the rollers 36. The conveyor device comprising the band 14 is now to be driven by means of a clutch transmitting rotary motion with slip because this conveyor device now should feed the dough to the sheeting rolls at a lower rate, whilst the conveyor device comprising the band 13 is now on the egress side and is driven at a rate substantially equal to the peripheral speed of the sheeting rolls by means of an overrunning clutch similar to that described hereabove and comprising as driving part a flange formed on the sprocket wheel 9.

The clutch transmitting motion with slip is constructed as shown in Fig. 2. A rigid friction disc 10" is fixed to the flange 10'. A second driven part constituted by a circular plate 16" is arranged on shaft 16 in facing relation to disc 10" and is pressed onto the latter by a helical spring 32 surrounding shaft 16 and bearing with its outer end on a circular plate 28 coaxial with plate 16". Pins 26 extending in diametral direction through a longitudinal slit 27 of the shaft and through the notches provided in both plates 16" and 28 which are in this manner non-rotatably but axially movably mounted on shaft 16. The compression of the spring 32 and accordingly the contact pressure of plate 16" on disc 10" can be adjusted by means of a freely accessible screw 31 screwably mounted into a sleeve 30 fixed to the outer bracket wall and having a hemispherical head acting by means of a washer 29 onto the pin 26 engaging the plate 28. The slip is obviously dependent on the contact pressure of plate 16" on disc 10" and since this pressure can be varied from a zero-value to a maximum by means of the arrangement just described, the rate at which the dough is conveyed to the sheeting rolls can be varied in a wide range not exceeding the peripheral speed of the sheeting rolls. The axial thrust put on the sprocket wheel 10 by spring 32 is taken by an antifriction thrust bearing 17 interposed between this wheel and the inner race of the adjacent radial bearing 18.

A similar slip clutch is provided for driving the conveyor device comprising the band 13 each time when the sheeting rolls are so rotated that the side on which this device is located is the ingress side.

A cheaper construction of the clutch mechanism is possible if a constant and non-adjustable value of the slip is satisfactory. In fact, in such case the above described overrunning clutch can be enabled by slight and cheap modifications to work as slip clutch as well. Fig. 4 shows the clutch so modified. The clutch includes the flange 10' and a first driven part 16a which is fixed on the shaft 16. The driven part 16a has recesses identical in shape to the wedge-shaped recesses in the driven part 16' of the clutch of Figs. 2 and 3. A blind hole 33 is bored from the intersection of the radial abutment surface with the adjacent bottom surface of each recess at an angle to both these surfaces and is fitted with a pre-compressed spring 34 acting on the corresponding friction roller 36' by means of a glider 35. The operation of this clutch as overrunning clutch when flange 10' rotates in the direction indicated by the arrow drawn in full lines is as explained hereabove. If this flange 10' rotates in the opposite direction, it remains in frictional engagement with the rollers 36' pressed thereon by the springs 34 with relatively considerable force and pushed thereby against the abutment surfaces. There are thus considerable frictional forces which are active in coupling the flange 10' to the part 16a so that rotary motion is transmitted with a slip ratio determined in advance, whereby the conveyor device situated on the ingress side of the sheeting rolls for a given direction of rotation of the latter works at a rate smaller than the peripheral speed of these rolls. This simplified construction permits to reduce still more the width of the space between the walls of the bracket lodging the chain gearing and the clutch mechanisms.

What I claim is:

1. A dough sheeter comprising a pair of rotatable superposed sheeting rolls at least one of which is adapted to be positively driven in opposite directions, a first and a second conveyor device located on opposite sides of the bite of the rolls and alternately functioning as dough feeding and removing conveyor devices depending upon the direction of rotation of the driven roll, a drive element carried by the driven roll, driven elements carried by the conveyor devices, drive transmitting means connecting said drive and driven elements and a slip clutch means operatively connected to the drive transmitting means and functioning with and without slip in accordance with the direction of rotation of the driven roll so that the feeding conveyor device conveys dough to the rolls at a conveying rate of speed less than the peripheral speed of the rolls while, at the same time, the dough removing conveyor device conveys dough away from the rolls at a conveying rate of speed substantially equal to the peripheral speed of the rolls.

2. A dough sheeter comprising a pair of drivingly connected superposed sheeting rolls adapted to be rotated in opposite directions and to have their direction of rotation simultaneously reversed, a first and a second conveyor device located on opposite sides of the bite of the rolls and alternately functioning as dough feeding and removing conveyor devices depending upon the direction of rotation of the rolls, a drive element carried by at least one of the rolls, driven elements carried by the conveyor devices, a drive transmitting member connecting said drive and driven elements and slip clutch means interposed between the driven elements and the conveyor devices and functioning with and without slip depending upon the direction of rotation of the drive transmitting member and the driven elements whereby the conveyor device feeding dough to the rolls is moved at a conveying rate of speed less than the peripheral speed of the rolls while the conveyor device removing dough from the rolls is moved at a conveying rate of speed substantially equal to the peripheral speed of the rolls.

3. A dough sheeter as claimed in claim 2, wherein each of the clutch means is adjustable to adjust the slip thereof.

4. A dough sheeter as claimed in claim 2, wherein each conveyor device includes a shaft and said one of the rolls includes a shaft, sprockets on said shafts constituting the drive and driven elements and an endless chain entrained over the sprockets and constituting the drive transmitting member.

5. A dough sheeter as claimed in claim 4, wherein each of said sprocket wheels on the shafts of the conveyor devices is mounted for free rotation on the shafts, and has as annular flange coaxial to the shaft and constituting the driving part of the clutch means, a driven part of the clutch means fixed on the shaft and surrounded by the flange, said driven part having tapered recesses friction rollers in said recesses wedged between the parts when the driving part rotates in one direction to connect the parts without slip and spring means backing said rollers and urging the rollers into contact with the driving part when it rotates in the opposite direction so that there is a slip ratio in the rotary transmission motion between the driving and driven parts.

6. A dough sheeter as claimed in claim 4, wherein each of the sprockets on the shafts of the conveyor devices is mounted for free rotation on such shaft and has an annular flange coaxial to the shaft and constituting the driving part of the clutch means, a member fixed on the shaft and surrounded by such flange and constituting a first driven part of the clutch means in one direction of rotation of the driving part, rollers carried by the first driven part and wedged between the driven part and the driving part in one direction of the driving part for transmission connection between the driving part and the driven part, a friction disc on the end of said driving part, a plate fitted on the shaft and abutting the disc and constituting a second driven part of the clutch means, spring means urging said plate into frictional engagement with the disc and means adjusting the tension of the spring means to control the amount of slip between the disc and the plate in the other direction of rotation of the driving part.

References Cited in the file of this patent
UNITED STATES PATENTS

| | | |
|---|---|---|
| 2,275,714 | Anetsberger et al. | Mar. 10, 1942 |
| 2,526,944 | Grainger | Oct. 24, 1950 |